(12) United States Patent
Noguchi

(10) Patent No.: US 7,336,186 B2
(45) Date of Patent: Feb. 26, 2008

(54) RFID TAG-CONTAINING APPARATUS AND RFID TAG-CONTAINING SEAL

(75) Inventor: Akane Noguchi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 131 days.

(21) Appl. No.: 11/186,457

(22) Filed: Jul. 21, 2005

(65) Prior Publication Data

US 2006/0017573 A1  Jan. 26, 2006

(30) Foreign Application Priority Data

Jul. 26, 2004  (JP) ............................. 2004-217455

(51) Int. Cl.
G08B 13/14 (2006.01)
(52) U.S. Cl. ................ 340/572.8; 340/572.1; 340/686.1; 235/375
(58) Field of Classification Search ............ 340/572.8, 340/572.1, 10.2, 539.32, 539.11, 539.23, 340/686.1, 825.49; 235/375, 383, 245, 380
See application file for complete search history.

(56) References Cited

U.S. PATENT DOCUMENTS

| | | | |
|---|---|---|---|
| 6,318,636 B1 * | 11/2001 | Reynolds et al. | 235/472.01 |
| 7,073,712 B2 * | 7/2006 | Jusas et al. | 235/451 |
| 7,088,242 B2 * | 8/2006 | Aupperle et al. | 340/539.32 |
| 2003/0076230 A1 | 4/2003 | Runyon et al. | |
| 2004/0100383 A1 | 5/2004 | Chen et al. | |

FOREIGN PATENT DOCUMENTS

| | | |
|---|---|---|
| DE | 10111063 A1 | 9/2002 |
| EP | 1271398 A1 | 1/2003 |
| JP | 2003-123040 | 4/2003 |
| JP | 2003-3123040 | 4/2003 |
| JP | 2004-188215 A | 7/2004 |

OTHER PUBLICATIONS

European Search Report, ", " European Patent Office (Munich), (Oct. 25, 2006).
European Patent Office, "Partial European Search Report," (Jul. 28, 2006).

* cited by examiner

*Primary Examiner*—Anh V. La
(74) *Attorney, Agent, or Firm*—Pillsbury Winthrop Shaw Pittman LLP (57) ABSTRACT

An RFID tag-containing apparatus which is capable of alerting a user to leakage of information stored in RFID tags without tailoring the RFID tags. At least one container section is capable of containing at least one article. A receiver section receives information transmitted from an RFID tag attached to the article contained in the container section. When the receiver section receives the information from the RFID tag, a notification signal is output for notifying a user that the information stored in the RFID tag has been be read.

11 Claims, 7 Drawing Sheets

| RFID TAG | NOTIFY OR NOT NOTIFY |
|---|---|
| INFORMATION OF RFID TAG 3a | × |
| INFORMATION OF RFID TAG 4a | ○ |
| INFORMATION OF RFID TAG 5a | ○ |
| INFORMATION OF RFID TAG 6a | × |
| ..... | ..... |
| ..... | ..... |
| ..... | ..... |

TBL

RFID TAG-CONTAINING APPARATUS AND RFID TAG-CONTAINING SEAL

BACKGROUND OF THE INVENTION

1. Field of the Invention

The present invention relates to an RFID tag-containing apparatus and an RFID tag-containing seal, which are capable of alerting a user to unintended reading of RFID tag information by a third party.

2. Description of the Related Art

In recent years, RFID tags (Radio Frequency ID tags) also called wireless IC tags have been widely used in sales management, inventory management, or distribution management. In general, an RFID tag is comprised of a small-sized IC chip and a metal antenna, and the IC chip has a size of 0.1 to several mm square. Each RFID tag can be assigned a unique ID. Further, it is possible to collectively write or read data in or from a plurality of RFID tags from a place somewhat remote from the RFID tags.

Many RFID tags are provided with a memory, a logic circuit, and coils, and are capable of reading and writing data by wireless communications. Further, they are capable of performing processing, such as computation, authentication, and encryption, using the logic circuit. A device that reads and writes data is called a reader/writer. The reader/writer is capable of performing wireless communications from a location at a distance of several centimeters to several meters.

Further, some RFID tags have a built-in battery, and others not. The RFID tags without a built-in battery are supplied with power by receiving radio waves from the reader/writer or a RFID tag reader. On the other hand, the RFID tags with a built-in battery are capable of actively transmitting information.

As mentioned above, RFID tags are used for various applications and it is expected that the use of RFID tags will further expand in the future. However, if a malicious third party reads information stored in an RFID tag attached to an article which the user is carrying with him/her, the information can be used for undesirable purposes. For this reason, the development of an apparatus or device is desired which can prevent unintended reading of such information by a third party.

A system disclosed in Japanese Laid-Open Patent Publication (Kokai) No. 2003-123040 is provided with authentication means for determining whether or not reading of information should be permitted. This system allows reading of only information approved by the authentication means for reading.

However, in this conventional system disclosed in Japanese Laid-Open Patent Publication (Kokai) No. 2003-123040, since the authentication means is provided in an RFID tag itself, the RFID tag inevitably becomes larger in size and higher in cost. Further, general-purpose RFID tags without the authentication means are incapable of even alerting the user to leakage of data.

SUMMARY OF THE INVENTION

It is an object of the present invention to provide an RFID tag-containing apparatus which is capable of alerting a user to leakage of information stored in RFID tags without tailoring the RFID tags.

To attain the above object, in a first aspect of the present invention, there is provided an RFID tag-containing apparatus comprising at least one container section that is capable of containing at least one article, a receiver device that receives information transmitted from an RFID tag attached to the article contained in the container section, and a notification signal output device that is operable when the receiver device receives the information, to output a notification signal for notifying the reception.

Preferably, the RFID tag-containing apparatus comprises a notification device that performs at least one of sound generation, light emission, and vibration based on the notification signal output from the notification signal output device.

To attain the above object, in a second aspect of the present invention, there is provided an RFID tag-containing apparatus comprising at least one container section that is capable of containing at least one article, a receiver device that receives information transmitted from an RFID tag attached to the article contained in the container section, a storage section that stores information stored in the RFID tag attached to the article contained in the container section, and setting information indicating whether or not to notify that the information stored in the RFID tag has been read when reading of the information has occurred, and a notification signal output device that is operable when the receiver device receives the information transmitted from the RFID tag, to refer to the storage section to thereby determine whether or not a notification of the reading of the information should be performed, and output a notification signal for the notification when the notification should be performed.

Preferably, the RFID tag-containing apparatus comprises a notification device that performs at least one of sound generation, light emission, and vibration based on the notification signal output from the notification signal output device.

To attain the above object, in a third aspect of the present invention, there is provided an RFID tag-containing apparatus comprising at least one shielded container section that is configured to block radio waves and contains at least one article therein, a receiver device that is disposed at a location close to the shielded container section, for receiving one of information transmitted from an RFID tag attached to the article contained in the shielded container section and a reading signal from an RFID reader, and a notification signal output device that is operable either when the receiver device receives the information transmitted from the RFID tag or when the receiver device receives the reading signal from the RFID reader, to output a notification signal for notifying the reception.

Preferably, the RFID tag-containing apparatus comprises a notification device that performs at least one of sound generation, light emission, and vibration based on the notification signal output from the notification signal output device.

To attain the above object, in a fourth aspect of the present invention, there is provided an RFID tag-containing apparatus comprising at least one shielded state-switchable container section that can be switched between a shielded state in which radio waves are blocked and a non-shielded state in which the radio waves are not blocked, and contains at least one article therein, a receiver device that is disposed at a location close to the shielded state-switchable container section, for receiving one of information transmitted from an RFID tag attached to the article contained in the shielded state-switchable container section and a reading signal from an RFID reader, a notification signal output device that is operable either when the receiver device receives the information transmitted from the RFID tag or when the receiver device receives the reading signal from the RFID reader, to output a notification signal for notifying the reception, and a state switching device that switches a state of the shielded state-switchable container section between the shielded state and the non-shielded state.

Preferably, the shielded state-switchable container comprises a plurality of shielded state-switching container sections, and the state switching device selects one of the shielded state-switchable container sections and switches the state thereof.

Preferably, the RFID tag-containing apparatus comprises a notification device that performs at least one of sound generation, light emission, and vibration based on the notification signal output from the notification signal output device.

To attain the above object, in a fifth aspect of the present invention, there is provided an RFID tag-containing apparatus comprising a body that is formed of a shield material capable of blocking radio waves, the body having at least one container section, at least one cover that is formed of a shield material capable of blocking radio waves, the cover being detachably provided on the body, a receiver device that is disposed at a location close to the body, for receiving one of information transmitted from an RFID tag attached to the article contained in the container section and a reading signal from an RFID reader, and a notification signal output device that is operable either when the receiver device receives the information transmitted from the RFID tag or when the receiver device receives the reading signal from the RFID reader, to output a notification signal for notifying the reception.

To attain the above object, in a sixth aspect of the present invention, there is provided an RFID tag-containing seal comprising a seal that is formed of a sheet-like member capable of blocking radio waves, the seal having one adhesive face and covering an article, a receiver device that is disposed at a location close to the seal, for receiving one of information transmitted from an RFID tag attached to the article covered by the seal and a reading signal from an RFID reader, and a notification signal output device that is operable either when the receiver device receives the information transmitted from the RFID tag or when the receiver device receives the reading signal from the RFID reader, to output a notification signal for notifying the reception.

Preferably, the receiver device and the notification signal output device are attached to the seal.

With the configurations of the RFID tag-containing apparatus and RFID tag-containing seal according to the present invention, it is possible to detect that information stored in an RFID tag which the user is carrying has been or is going to be read, thereby enabling the user to be on the alert for reading of the information by a malicious third party.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the drawings showing preferred embodiments thereof.

Figure 1:
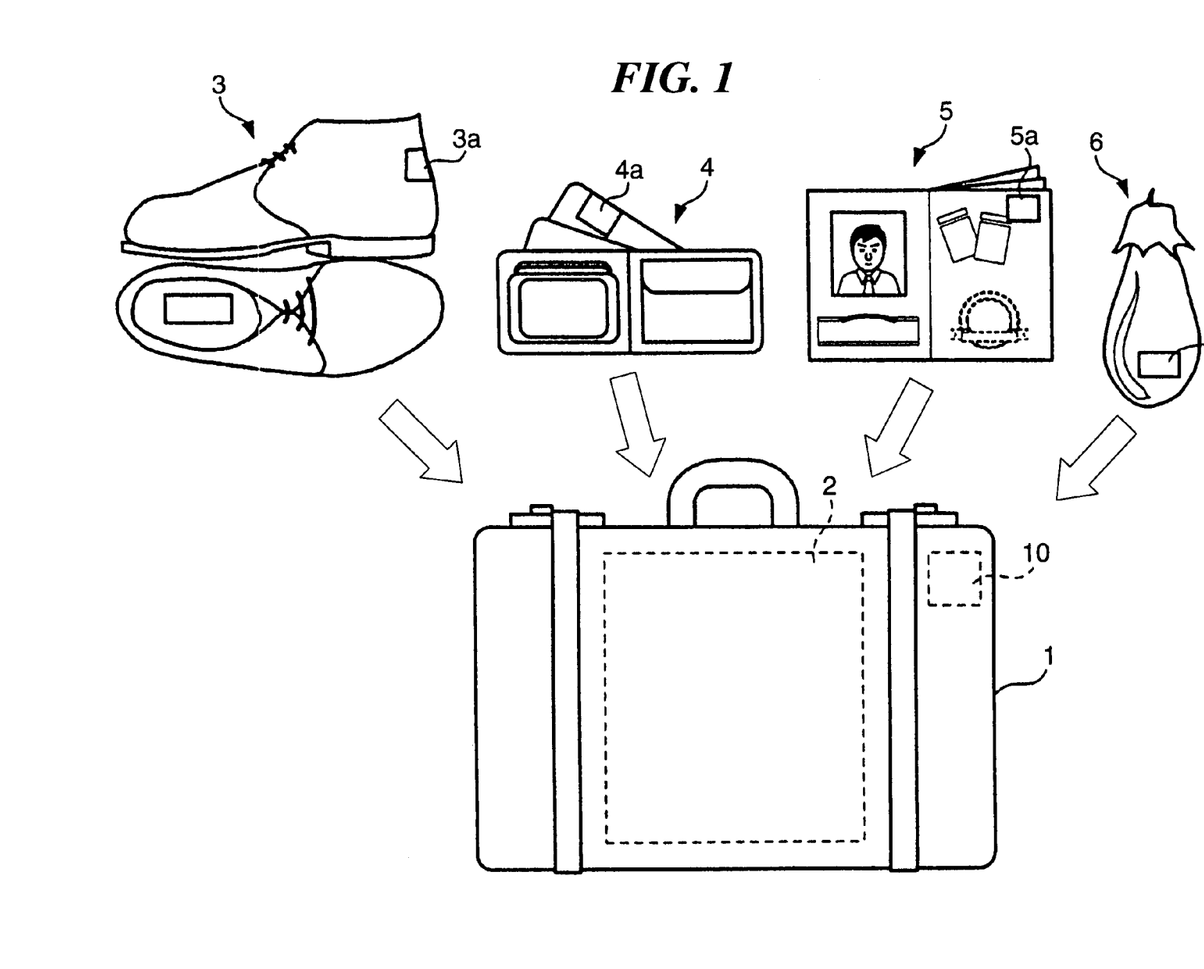
FIG. 1 is a schematic view showing the appearance of an RFID tag-containing apparatus according to a first embodiment of the present invention.

FIG. 1 is a schematic view showing the appearance of an RFID tag-containing apparatus according to a first embodiment of the present invention. In FIG. 1, reference numeral 1 designates a suitcase-type body. Similarly to a general suitcase, the body 1 can be opened and closed and can be carried by the user. Within the body 1, there is formed a container section 2 that can contain various articles, such as shoes 3, a wallet 4, a passport 5, and a vegetable 6. RFID tags 3a to 6a are attached to the shoes 3, the wallet 4, the passport 5, and the vegetable 6, respectively.

Figure 2:
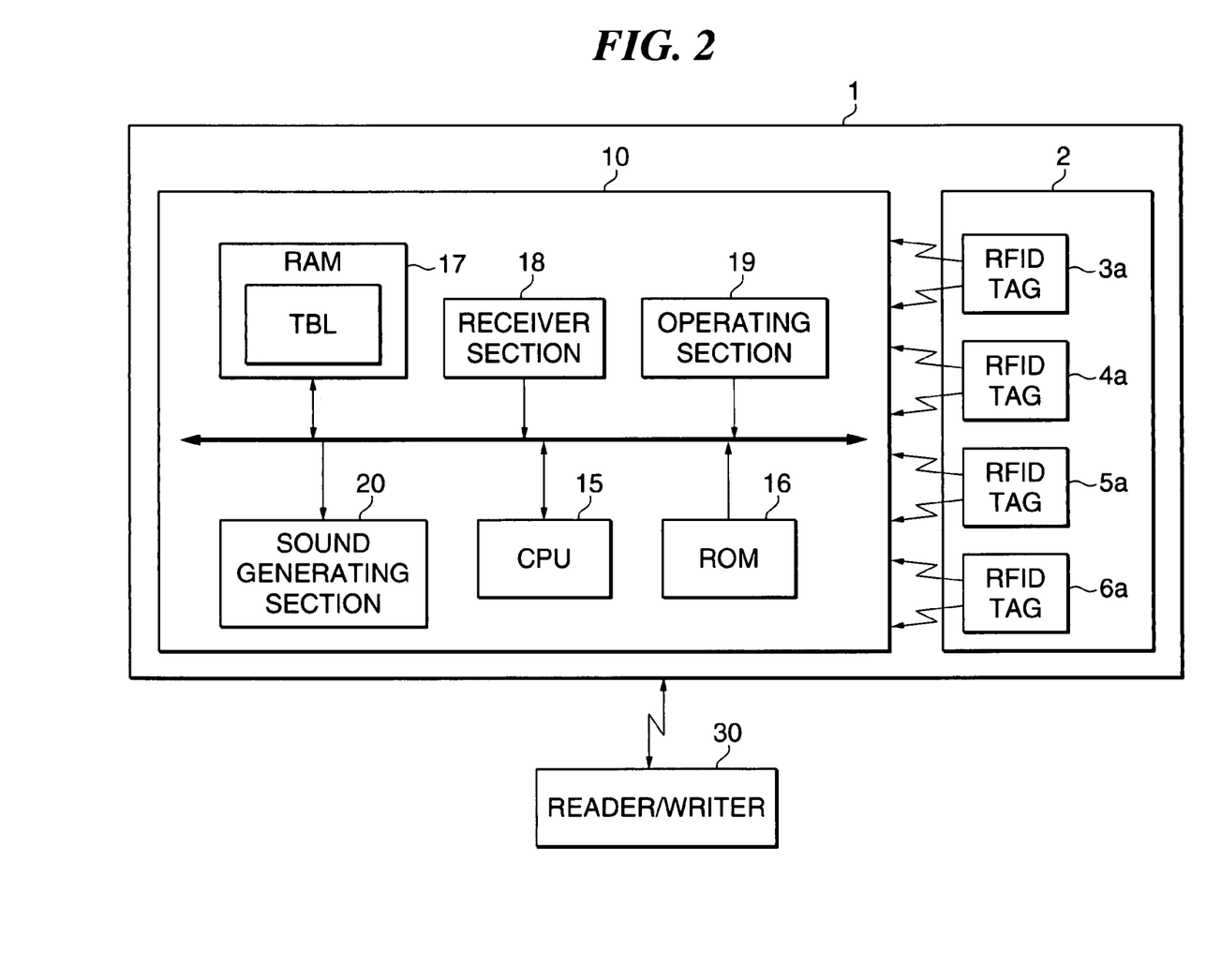
FIG. 2 is a block diagram showing the circuit configuration of the RFID tag-containing apparatus in FIG. 1.

Further, in FIG. 1, reference numeral 10 designates a control section provided in the body 1. FIG. 2 is a block diagram showing the circuit configuration of the body 1 in FIG. 1. In FIG. 2, reference numeral 15 designates a CPU that controls the components of the control section 10. The CPU 15 operates on a program stored in a ROM 16. Reference numeral 17 designates a RAM used as a work area for the CPU 15, and the RAM 17 has a non-volatile area in which a table TBL (see FIG. 3) is stored. Reference numeral 18 designates a receiver section that reads information transmitted from the RFID tags. The information read by the receiver section 18 is supplied to the CPU 15.

Further, the receiver section 18 has a function of outputting a reading signal to the RFID tags to supply power to them. The receiver section 18 is capable of switching on and off the output of the reading signal for the reading of the RFID tags. While the receiver section 18 is incapable of supplying power to the RFID tags when the output of the reading signal is OFF, when a RFID tag outputs information in response to a reading signal received from an external reader/writer, the receiver section 18 is capable of reading the information.

In FIG. 2, reference numeral 19 designates an operating section having ten keys and other operators. The operating section 19 outputs a signal in response to an operation by the user to the CPU 15. Reference numeral 20 designates a sound generating section. The sound generating section 20 generates sound under the control of the CPU 15. Further, reference numeral 30 designates a reader/writer. The reader/writer 30 is installed e.g. in a predetermined facility.

Next, a description will be given of the operation of the RFID tag-containing apparatus in FIG. 1. First, the user enables the reading signal output function of the receiver section 18 and causes the receiver section 18 to sequentially read the RFID tags 3a, 4a, 5a, and 6a attached to the shoes 3, the wallet 4, the passport 5, and the vegetable 6, respectively. If pieces of information stored in the RFID tags 3a, 4a, 5a, and 6a are in printed form and can be viewed, the user may input the information by operating the ten keys and the like of the operating section 19. After the receiver section 18 has read the RFID tags, the user disables the reading signal output function of the receiver section 18.

Figure 3:
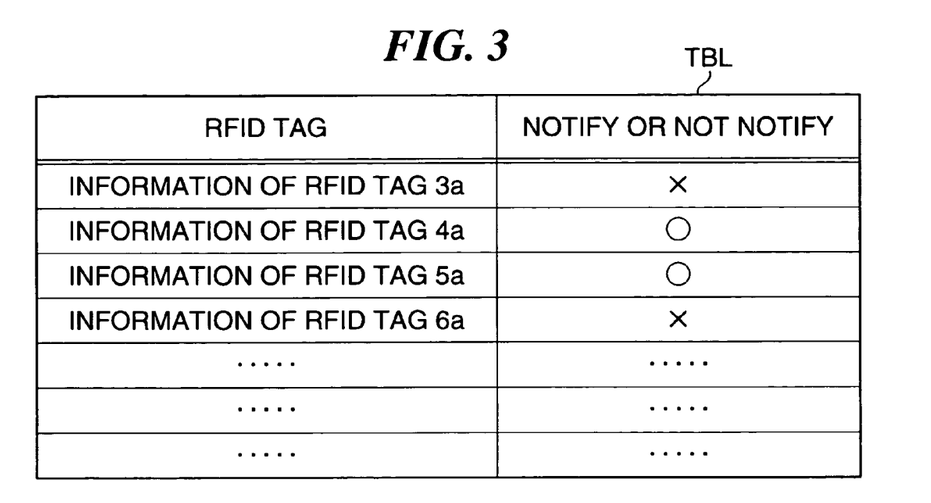
FIG. 3 is a conceptual view showing contents stored in a table provided in a RAM appearing in FIG. 2.

Thus, the information stored in the RFID tags 3a, 4a, 5a, and 6a is input via the receiver section 18 or the operating section 19. Then, the input information is written in the table TBL. FIG. 3 shows the table TBL in which the information input from the RFID tags 3a, 4a, 5a, and 6a is entered. Further, whenever information from an RFID tag is input, the user operates the operating section 19 to write setting information indicating whether to notify the user that the information from the RFID tag has been read whenever reading of the information by an external reader/writer occurs. In FIG. 3, the table TBL is set such that when information stored in the RFID tags 4a and 5a is read by an external reader/writer, the user is notified of the fact.

Let it be assumed that the reader/writer 30 is possessed by a malicious third party, and the user carrying the body 1 is approaching the reader/writer 30. In this case, when the body 1 enters the reading range of the reader/writer 30, the RFID tags 3a, 4a, 5a, and 6a are supplied with power simultaneously, and the information stored therein is output. The information is received not only by the reader/writer 30 but also by the receiver section 18.

Each piece of information read from an associated RFID tag by the receiver section 18 is supplied to the CPU 15. The CPU 15 refers to the table TBL based on the information and determines whether or not to notify the user that the information in the RFID tag has been read by the external reader/writer 30. Since in the illustrated example, the RFID tag 4a of the wallet 4 and the RFID 5a of the passport 5 are set such that the user is to be notified, the CPU 15 instructs the sound generating section 20 to generate sound. Thus, the user knows that the information stored in the RFID tags associated with the articles contained in the body 1 has been read by the external reader/writer 30, and hence can be on the alert. In this case, if the reader/writer 30 can be detected, the user can negotiate with the owner of the reader/writer 30.

Further, if the user carrying the body 1 is passing e.g. through an airport gate provided with a reader/writer, and the body 1 enters the reading range of the reader/writer, sound is output by the sound generating section 20 similarly to the above described case. In this case, however, from the situation that the user is passing through the airport gate, he/she can judge that the RFID information is being normally read by the reader/writer managed by the airport authorities, and recognizes that he/she need not be particularly on the alert.

In this way, the user can judge whether or not he/she is in a situation in which information is to be normally read from the RFID tags, so that when hearing the sound generated by the sound generating section 20, the user can determine whether or not to be on the alert.

Further, in the first embodiment, the user can set in the table TBL whether or not the user needs to be notified that information stored in RFID tags in the container section 2 has been read by an external reader/writer. Therefore, for example, when only numerous vegetables 5 are contained in the container section 2, the table TBL may be configured such that no notification is given even if the information is read by any reader/writer. In short, the table TBL can be set such that no notification is issued about information which is regarded as so low in required security level that the user need not monitor the reading thereof. This makes it possible to prevent the nuisance of being notified whenever information low in required security level is read by a reader/writer. Further, by virtue of the provision of the table TBL, the user can select between respective options of being notified and not being notified that information has been read from an RFID tag stored in the container section 2, by an external reader/writer, and moreover, even if information stored in an RFID tag possessed by a person being present near the user is read, the user is not notified of the fact. This enables the user to monitor only his/her own RFID tags.

Next, a second embodiment of the present invention will be described.

Figure 4:
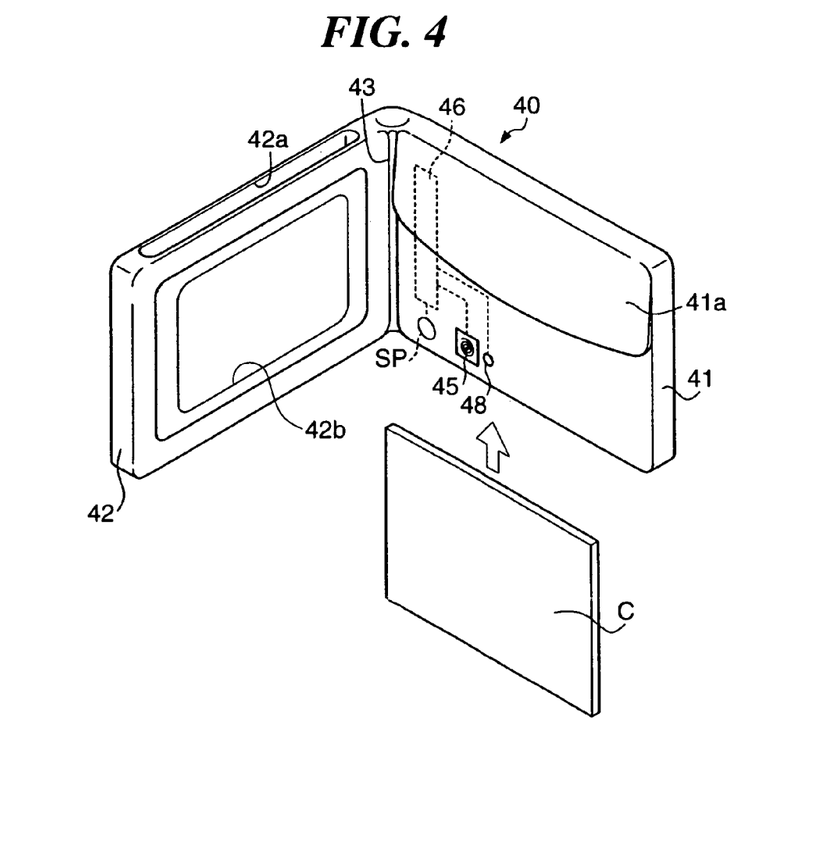
FIG. 4 is a perspective view showing the appearance of an RFID tag-containing apparatus according to a second embodiment of the present invention.

FIG. 4 is a perspective view showing the appearance of an RFID tag-containing apparatus according to the second embodiment of the present invention. Reference numeral 40 in FIG. 4 designates a body. The body 40 is in the form of a foldable wallet. Reference numeral 41 designates a shielded container section. The shielded container section 41 has a container part that can contain several cards C having the size of a commuter pass or that of credit cards. The shielded container section 41 has an open upper part, as viewed in FIG. 4, through which a card can be put in and taken out. Reference numeral 41a designates a flap for covering the open upper part. When the flap 41a is raised, the opening of the shielded container section 41 is exposed. The shielded container section 41 including the flap 41a has been subjected to an electromagnetic shielding treatment. Therefore, the cards contained in the shielded container section 41 cannot be accessed by radio waves from outside.

Reference numeral 42 in FIG. 4 designates a non-shielded container section. Similarly to the shielded container section 41, the non-shielded container section 42 has a container part that can contain several cards C. The non-shielded container section 42 has an upper end thereof formed with an opening 42a, but is not provided with a flap or lid. Further, the non-shielded container section 42 has an opening 42b formed in a front face thereof, as viewed in FIG. 4, so that a card contained in the non-shielded container section 42 can be viewed through the opening 42b. The shielded container section 41 and the non-shielded container section 42 are joined to each other by a joint 43, as shown in FIG. 4, such that the body 40 can be folded along the joint 43. The body 40 in the folded state can be received in a breast pocket of a shirt or a jacket.

Reference numeral 45 in FIG. 4 designates an antenna section attached to a lower part of a front face of the shielded container section 41, as viewed in FIG. 4. The antenna section 45 receives a reading signal output from an RFID reader/writer. Further, a microspeaker SP is mounted on the front face of the shielded container section 41 in the vicinity of the antenna section 45. The antenna section 45 and the microspeaker SP are electrically connected to a notification circuit 46 provided in the shielded container section 41, by shielded connection wires, not shown.

Figure 5:
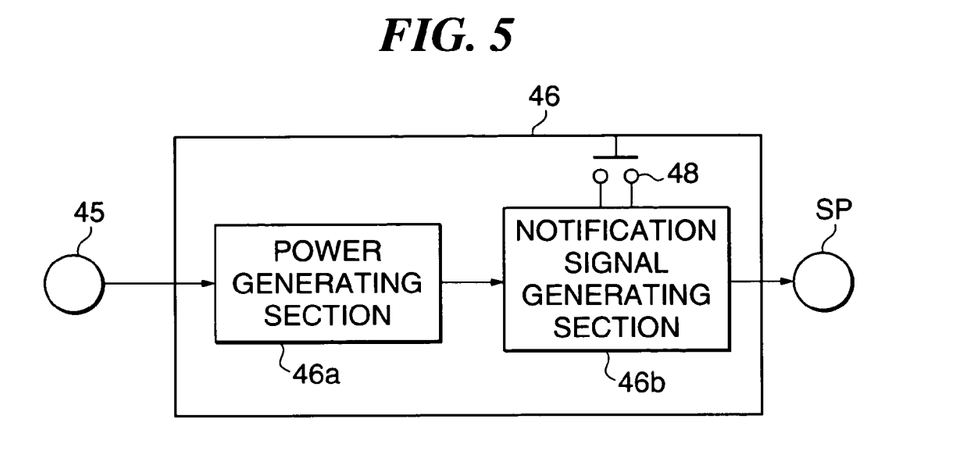
FIG. 5 is a block diagram showing the circuit configuration of a notification circuit of the RFID tag-containing apparatus in FIG. 4.

The notification circuit 46 is configured as shown in FIG. 5. Reference numeral 46a in FIG. 5 designates a power generating section that generates and outputs a power generation detection signal when receiving an electromotive force generated by excitation of the antenna section 45 having received a reading signal. Upon receiving the power generation detection signal from the power generating section 46a, a notification signal generating section 46b generates a notification signal for causing the microspeaker SP to sound. When the body 40 constructed as above enters the reading range of a reader/writer to receive a reading signal therefrom, a notification sound is output from the microspeaker SP.

Next, a description will be given of the operation of the RFID tag container apparatus of the second embodiment. First, the user puts RFID tags or RFID-tagged cards or the like in the shielded container section 41. Then, the user goes to various places with the body 40. If an RFID reader is provided in a place visited by the user, when the body 40 enters the reading range of the RFID reader, the antenna section 45 receives a reading signal. As a result, the power generating section 46a generates the power generation detection signal, and the notification signal generating section 46b generates the notification signal, so that the microspeaker SP generates the notification sound.

This makes the user aware of the presence of the reader/writer around the user. When the user is e.g. near a check-out counter in a supermarket, a ticket gate in a railroad station, or a gate in an airport, the user can judge that he/she is in a situation where RFID tags are normally read. In this case, the user takes out an associated RFID tag or RFID-tagged card C from the shielded container section 41, and allows the reader/writer to read RFID tag information. Alternatively, the user can move the taken-out card C from the shielded container section 41 to the non-shielded container section 42 to thereby allow the reader/writer to read RFID tag information.

Even when the notification sound is output from the microspeaker SP, if the user judges that he/she is in a place improper for allowing RFID tag information to be read, the user ignores the notification sound without taking out the associated card from the shielded container section 41.

As described above, according to the present embodiment, RFID tag or tags within the shielded container section 41 are not yet read at the time the notification sound is output, so that it is possible to prevent important personal information or the like from being read. Meanwhile, in a situation where RFID tag information needs to be read, the user has only to take out the associated card C from the shielded container section 41.

It should be noted that the notification signal generating section 46b may be provided with a switch 48 for stopping the output of the notification sound. With this configuration, the output of the notification sound can be stopped simply by pressing the switch 48 earliest possible after recognition of the sound.

Although in the above described embodiment, the shielded container section 41 has a size which allows storage of several cards or the like, this is not limitative, but the shielded container section 41 may be formed to have a larger capacity. Further, the non-shielded container section 42 may not be provided. In this case, when the notification sound is output, an associated RFID-tagged card is taken out from the shielded container section 41 to allow the same to be read by the reader/writer.

Next, a third embodiment of the present invention will be described.

Figure 6:
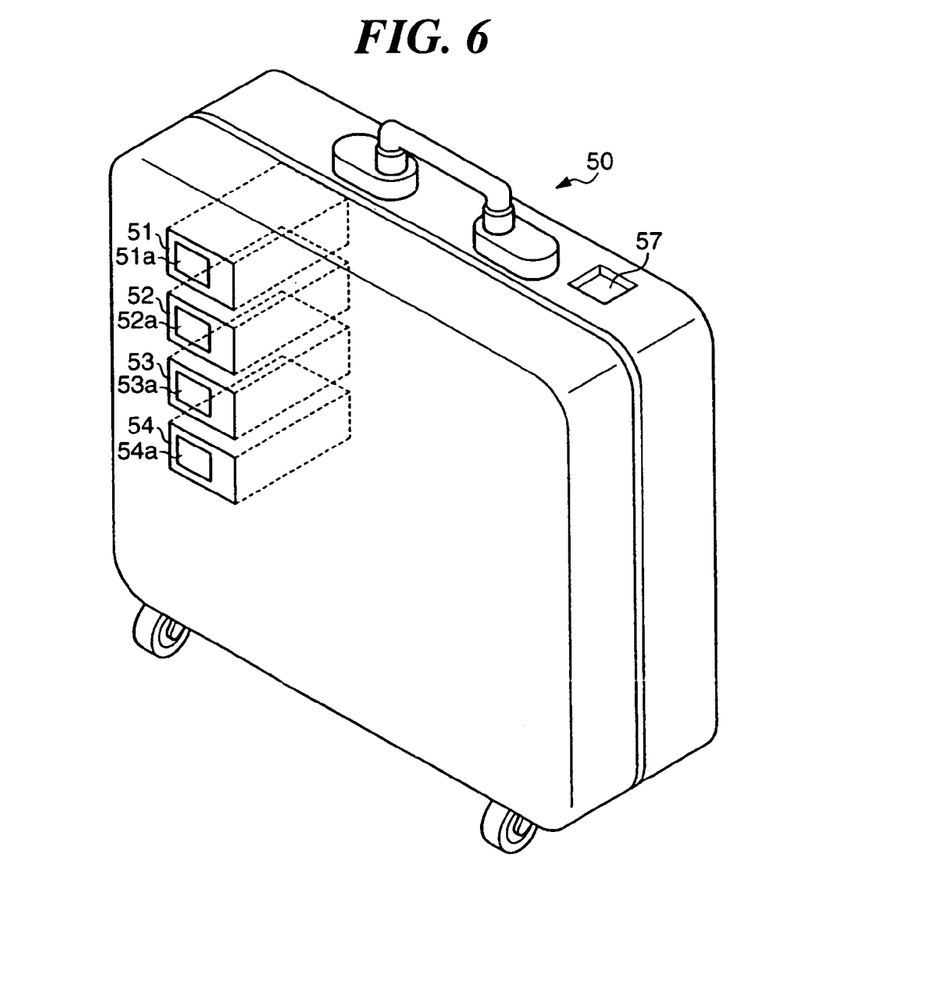
FIG. 6 is a perspective view showing the appearance of an RFID tag-containing apparatus according to a third embodiment of the present invention.

FIG. 6 is a perspective view showing the appearance of an RFID tag-containing apparatus according to the third embodiment of the present invention. In FIG. 6, reference numeral 50 designates a suitcase-type body. The body 50 is provided therein with a plurality of magnetically shielded parallelepiped shielded container sections 51 to 54. The front faces of the respective shielded container sections 51 to 54, as viewed in FIG. 6, are exposed on a surface of the body 50. In the exposed faces of the respective shielded container sections 51 to 54, there are provided shutter devices 51a to 54a, respectively. When any of the shutter devices 51a to 54a is opened, an article can be put in and taken out of an associated one of the shielded container sections 51 to 54. Further, when any of the shutter devices 51a to 54a is open, the interior of an associated one of the shielded container sections 51 to 54 is communicated with the external space via its opening, and therefore the shielded container section becomes unshielded. The body 50 is provided with a control section 55, described below with reference to FIG. 7.

Figure 7:
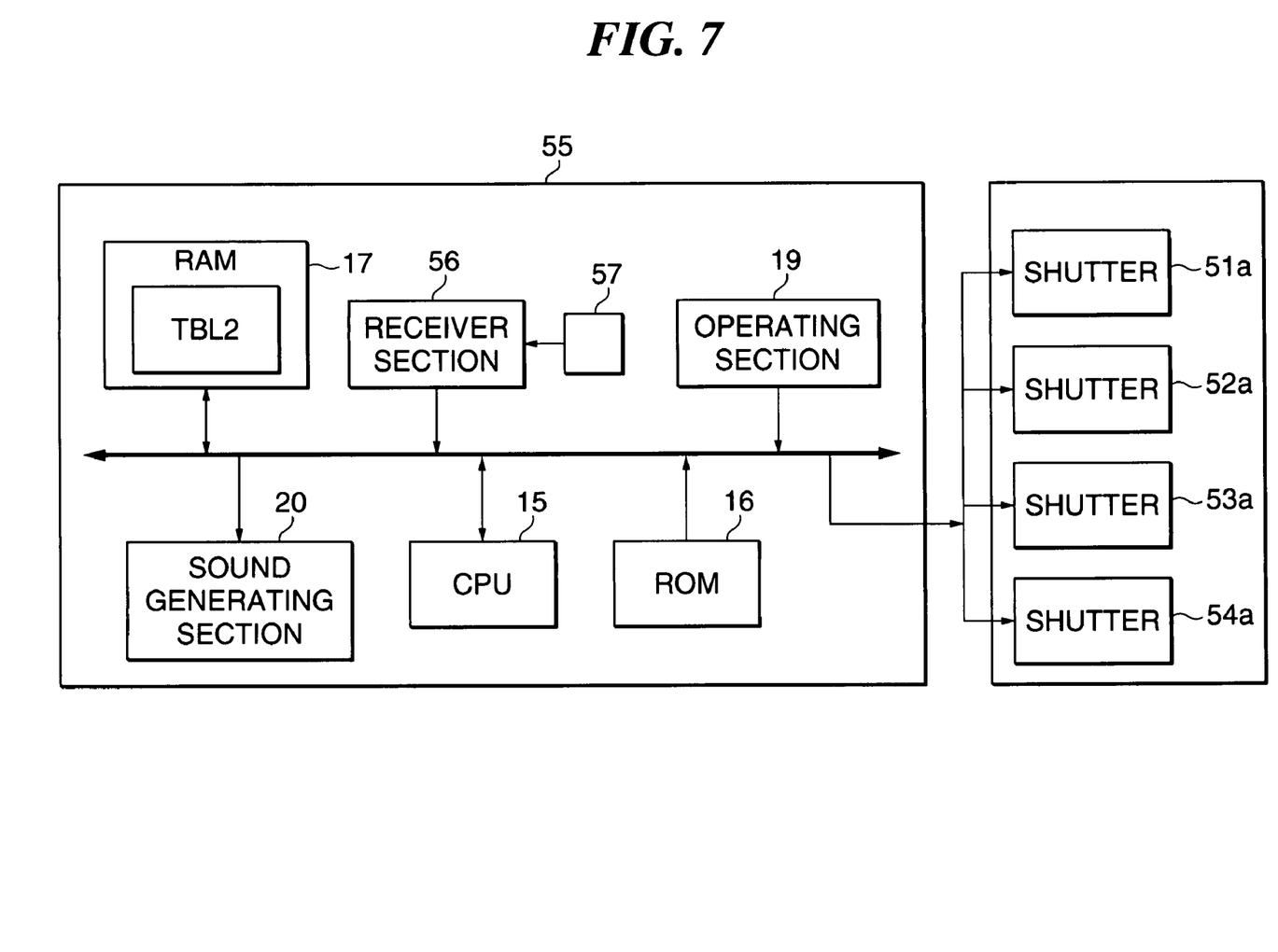
FIG. 7 is a block diagram showing the circuit configuration of the RFID tag-containing apparatus in FIG. 6.

FIG. 7 is a block diagram showing the circuit configuration of the RFID tag-containing apparatus of the present embodiment. In FIG. 7, component parts and elements corresponding to those shown in FIG. 2 are designated by identical reference numerals, and detailed description thereof is omitted. When an antenna section 57 of the control section 55, which is exposed on a surface of the body 50, receives a reading signal from an RFID tag reader/writer, a receiver section 56 generates a detection signal and outputs the same to the CPU 15. The receiver section 56 may be identical in configuration to the power generating section 46a in FIG. 5.

The CPU 15 supplies a control signal to a selected one of the shutter devices 51a to 54a in response to an operation of the operating section 19 so as to control opening/closing of the shutter device. In other words, the user can operate the operating section 19 to instruct the CPU 15 to open or close a selected one of the shutter devices 51a to 54a.

Next, a description will be given of the operation of the thus constructed RFID tag-containing apparatus of the present embodiment. First, the user puts RFID tags or RFID-tagged articles in the respective shielded container sections 51 to 54. Then, when the user carrying the body 50 enters the reading range of an RFID reader/writer, the antenna section 57 receives a reading signal. In response to the reading signal, the receiver section 56 supplies a detection signal to the CPU 15 to cause the sound generating section 20 to generate sound.

The sound generated by the sound generating section 20 makes the user aware of the presence of the reader/writer around the user. When the user is e.g. near a check-out counter in a supermarket, a ticket gate in a railroad station, or a gate in an airport, the user can judge that he/she is in a situation where RFID tags are normally read. In this case, to unshield one of the shielded container sections 51 to 54 which contains an RFID tag relevant to the situation, the user opens an associated one of the shutter devices 51a to 54a by operating the operating section 19. The RFID tag attached to an article contained in the shielded container section having its shutter device opened is read by the reader/writer.

Even when the sound generating section 20 generates the notification sound, if the user judges that he/she is in a place improper for allowing RFID tag information to be read, the user ignores the notification sound without opening any of the shutter devices 51a to 54a.

As described above, according to the present embodiment, none of the RFID tags within the shielded container sections 51 to 54 are not yet read at the time the notification sound is output, so that it is possible to prevent important personal information or the like from being read. Further, in a situation where an RFID tag within one of the shielded container sections 51 to 54 needs to be read, the user can unshield only the shielded container section relevant to the situation to make the required RFID tag alone readable.

The method of unshielding the shielded container sections 51 to 54 is not limited to the use of the shutter devices, but any method may be employed which enables switching between the shielded state and the non-shielded state.

Further, information designating a shutter device to be opened when the antenna section 57 receives a reading signal may be written in a table TBL2 provided in a non-volatile area of the RAM 17, to thereby allow the shutter device designated in the table TBL2 to be automatically opened when the receiver section 56 outputs the detection signal. In this case, if there is an RFID tag which is frequently read in a certain area, the RFID tag may be stored in a shielded container section associated with opening-instructing information written in the table TBL2. Then, when the notification sound is output, the shielded container section is automatically unshielded without the user operating the operating section 19, and therefore it is possible to save the user's time and labor. Although in the present embodiment, a plurality of shielded container sections are provided, the body 50 may have a single shielded container section.

The present invention is not limited to the above described embodiments, and can be practiced in various forms.

If it is desired in the first embodiment described above that a notification is issued when any one of the RFID tags contained in the container section 2 has been read, the table TBL may be eliminated. In this case, when information on the read RFID tag is supplied from the receiver section 18, the CPU 15 may cause the sound generating section 20 to output the notification sound.

Further, the notification sound may be generated using a simple waveform or alternatively a complicated waveform such as a melody or the like. Furthermore, different kinds of sounds may be used for the respective RFID tags. This enables the user to determine, simply by hearing a notification sound, whether or not the sound is generated for an RFID tag for security of which the user should be on the alert. To vary the sounding mode every RFID tag, for example, information on a sounding mode to be used may be written in advance in the table TBL in association with each RFID tag, and the CPU 15 may be configured to refer to the table TBL to instruct the sound generating section 20 to generate sound in the associated sounding mode.

Although in the above described embodiments, notification is performed using sound, this is not limitative, but light from an LED or the like or vibration from a vibrator may be used. In short, any notification means may be used insofar as it can make the user aware that an RFID tag has been (or is going to be) read.

Further, the notification means may be provided separately from the RFID tag container section(s). For example, an incoming call tone of a cellular phone or a vibrator may be used as notification means. In this case, radio waves (such as Bluetooth) may be used to output a notification signal. The cellular phone used for this purpose is configured such that an incoming call tone is sounded or the vibrator is driven when the notification signal is received.

In the second and third embodiments, the notification sound is output when a reading signal from a reader/writer is detected, but instead, the notification sound may be output upon detection of information transmitted in response to a reader/writer reading a freely-readable dummy RFID tag exposed in a non-shielded state.

Although in the above described third embodiment, the respective shutter devices 51a to 54a of the shielded container sections 51 to 54 are configured to be automatically opened and closed, the shutter devices 51a to 54a may be opened and closed manually. In this case, the user directly or manually operates the shutter device in place of issuing an opening/closing instruction using the operating section 19.

Figure 8:
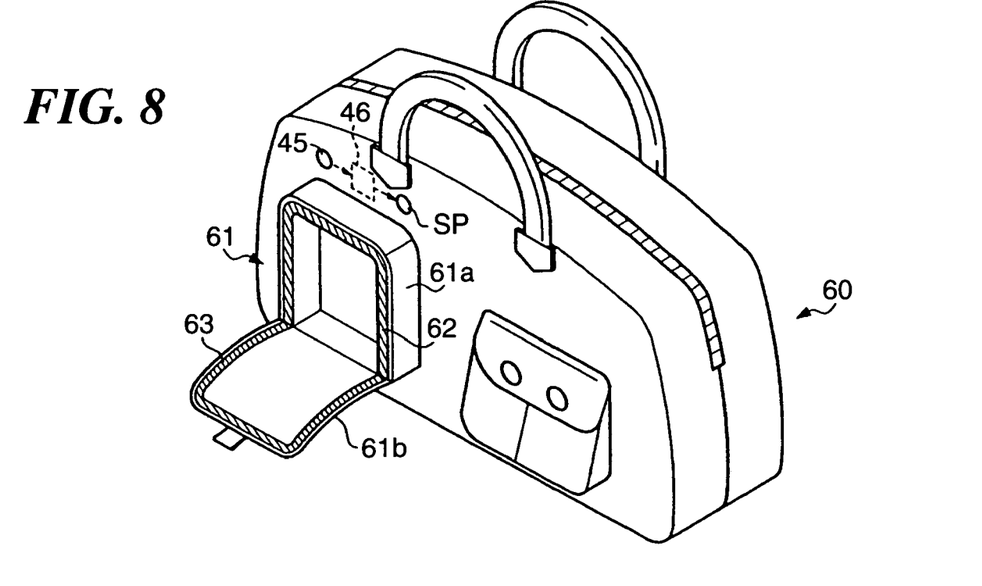
FIG. 8 is a perspective view showing the appearance of an RFID tag-containing apparatus according to a fourth embodiment of the present invention.

Further, to unshield the shielded container sections 51 to 54 manually, other various configurations can be envisaged. FIG. 8 shows one example of the configuration. FIG. 8 is a perspective view showing the appearance of an RFID tag-containing apparatus according to a fourth embodiment of the present invention. Reference numeral 60 in FIG. 8 designates a bag having a pocket section 61. The pocket section 61 is comprised of a container section 61a for containing an article, and a cover 61b formed of a soft material (cloth or vinyl) for covering the container section 61a. The container section 61a and the cover 61b are shielded by respective shielding members. The container section 61a has a parallelepiped space, and a mating surface fastener 62 is attached to all sides of the container section 61a. The cover 61b also has a mating surface fastener 63 attached to all sides thereof. When the mating surface fasteners 62 and 63 are engaged with each other, the container section 61a is fully closed by the cover 61b so as to block a radio wave from being transmitted into or out of the container section 61a.

The antenna section 45 and the microspeaker SP are arranged in the vicinity of the pocket section 61 in a state exposed to the outside, and the notification circuit 46 is provided within the bag 60. This arrangement of the present embodiment is identical to that shown in FIG. 5.

With the arrangement described above, the user puts a RFID tag or RFID-tagged article in the container section 61a and closes the container section 61a with the cover 61b. Then, when the bag 60 enters the reading range of an RFID reader/writer, the antenna section 45 receives a reading signal, and a notification sound is output from the microspeaker SP. When the user hears the notification sound and judges that he/she is in a proper place where the RFID tag is normally read, he/she opens the cover 61b to electromagnetically expose the container section 61a, and allows the RFID tag within the container section 61a to be read. If the user hears the notification sound in an improper place for allowing the RFID tag to be read, the user leaves the container section 61a covered by the cover 61b without opening the same.

Figure 9:
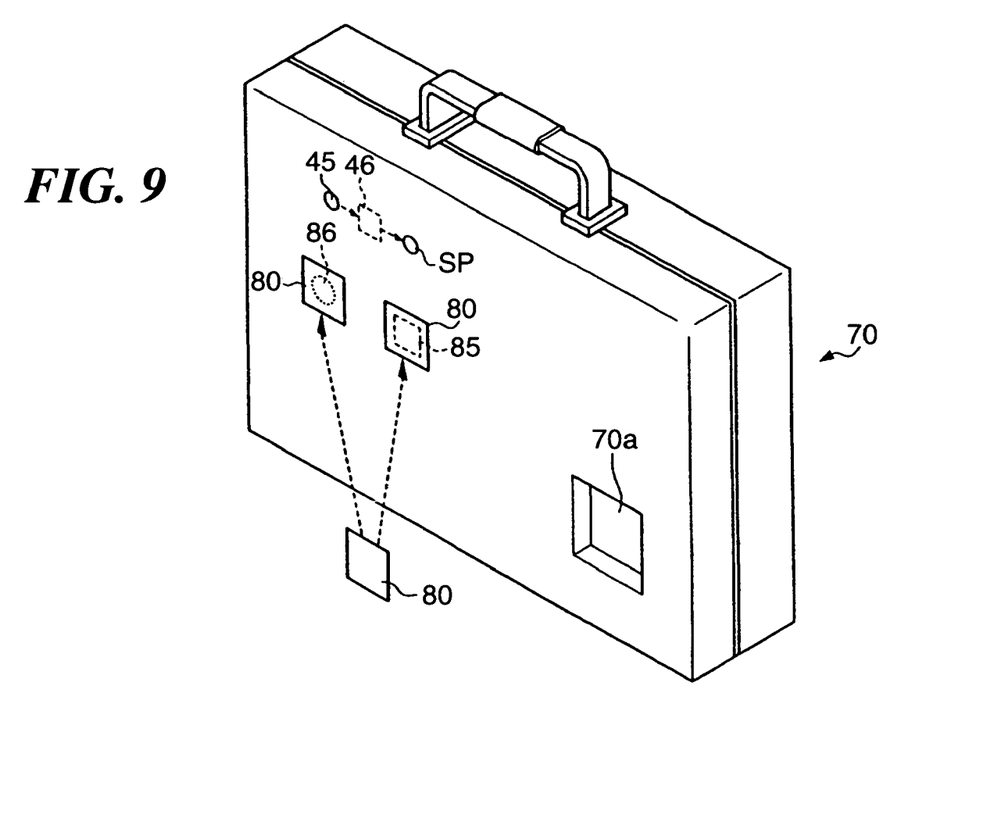
FIG. 9 is a perspective view showing the appearance of an RFID tag-containing seal according to a fifth embodiment of the present invention.

FIG. 9 is a perspective view showing the appearance of an RFID tag-containing seal according to a fifth embodiment of the present invention.

Reference numeral 70 in FIG. 9 designates an attaché case-type metal case formed of a metal material, such as aluminum or duralumin. The antenna section 45 and the microspeaker SP are arranged on an upper part of the metal case 70 in a state exposed to the outside, as viewed in FIG. 9, and the notification circuit 46 is provided inside the metal case 70. This arrangement of the present embodiment is identical to that shown in FIG. 5. Reference numeral 80 designates a shield seal formed of an electrically conductive material. In the illustrated example, the shield seal 80 has a shape of a square whose sides are approximately 5 cm long. The shield seal 80 has a back surface thereof coated with an adhesive so that the shield seal 80 can be affixed to or peeled off the surface of the metal case 70 as required.

With this arrangement, the user affixes an RFID-tagged article, such as a card 85, to the surface of the metal case 70, in a state covered by the shield seal 80. Then, when the metal case 70 enters the reading range of an RFID reader/writer, the antenna section 45 receives a reading signal, and a notification sound is output from the microspeaker SP. When the user hears the notification sound and judges that he/she is in a proper place, he/she peels off the shield seal 80 and electromagnetically exposes the card 85 to allow an RFID tag attached to the card 85 to be read. If the user hears the notification sound when he/she is in an improper place for allowing the reading, the user leaves the card 85 covered by the shield seal 80 without peeling off the shield seal 80.

A plurality of shield seals 80 may be affixed to the metal case 70 as shown in FIG. 9. Further, an RFID tag 86 itself may be attached to the metal case 70 by the associated shield seal 80.

Further, if the metal case 70 has a recess 70a formed in the surface thereof such that the recess 70a can be covered by a shield seal 80, even a slightly thicker article can be contained in the recess 70a. Further, the shape and/or size of the shield seal 80 may be arbitrarily selected according to use thereof. Moreover, if the shield seals 80 are colored or patterned, it is possible to identify a shield seal 80 to be peeled off when the notification sound is output, which is convenient to the user.

Figure 10:
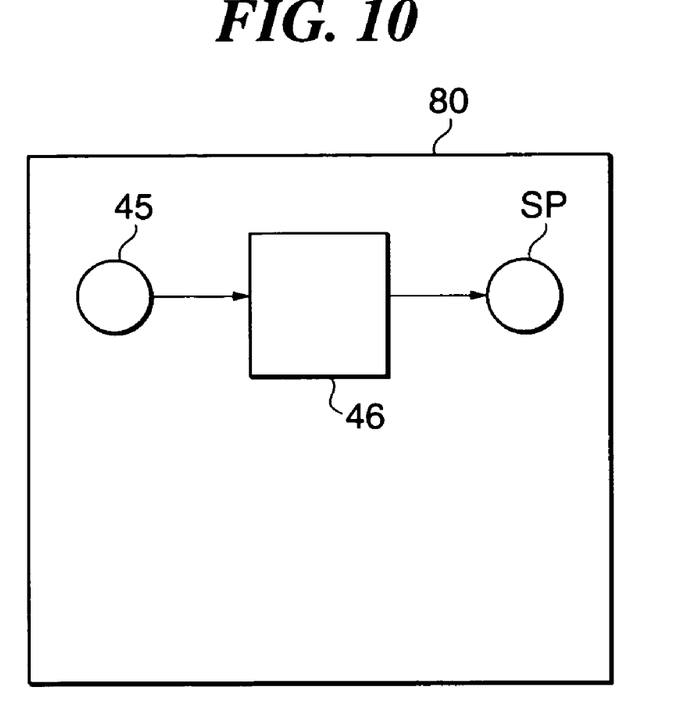
FIG. 10 is a front view of a variation of a shield seal as the RFID tag-containing seal in FIG. 9.
Figure 11:
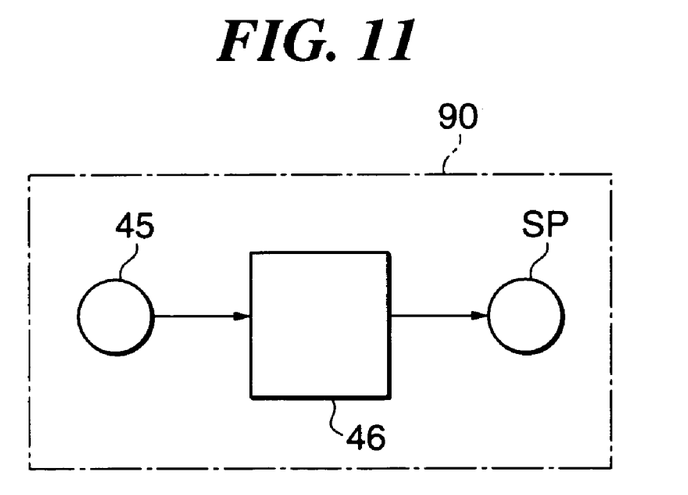
FIG. 11 is a front view of a variation of an antenna section of the RFID tag-containing seal in FIG. 9.

Furthermore, the antenna section 45, the microspeaker SP, and the notification circuit 46 may be provided in a shield seal 80 as shown in FIG. 10. In this case, it is not necessary to provide the antenna section 45, the microspeaker SP, and the notification circuit 46 on the metal case 70, and hence a general metal case can be used. Moreover, the antenna section 45, the microspeaker SP, and the notification circuit 46 may be formed as a notification unit 90 as shown in FIG. 11. In this case, the notification unit 90 is attached to the metal case 70 using an adhesive or something like a string.

What is claimed is:

1. An RFID tag-containing apparatus comprising:
    at least one shielded state-switchable container section for containing an article therein, and being switchable between a shielded state in which radio waves are blocked and a non-shielded state in which the radio waves are not blocked;
    a receiver device that is capable of receiving information transmitted from an RFID tag attached to the article contained in said at least one shielded state-switchable container section;
    a notification signal output device that is operable when said receiver device receives the information, to output a notification signal for notifying the reception; and
    a state switching device that switches a state of said shielded state-switchable container section between the shielded state and the non-shielded state.

2. An RFID tag-containing apparatus as claimed in claim 1, comprising a notification device that performs at least one of sound generation, light emission, and vibration based on the notification signal output from said notification signal output device.

3. An RFID tag-containing apparatus comprising:
    at least one shielded state-switchable container section for containing an article therein, and being switchable between a shielded state in which radio waves are blocked and a non-shielded state in which the radio waves are not blocked;
    a receiver device that is capable of receiving information transmitted from an RFID tag attached to the article contained in said at least one shielded state-switchable container section;
    a storage section that stores information stored in the RFID tag, and setting information indicating whether or not to notify that the information stored in the RFID tag has been read when reading of the information has occurred;
    a notification signal output device that is operable when said receiver device receives the information transmitted from the RFID tag, to refer to said storage section to thereby determine whether or not a notification of the reading of the information should be performed, and output a notification signal for the notification when the notification should be performed; and
    a state switching device that switches a state of said shielded state-switchable container section between the shielded state and the non-shielded state.

4. An RFID tag-containing apparatus as claimed in claim 3, comprising a notification device that performs at least one of sound generation, light emission, and vibration based on the notification signal output from said notification signal output device.

5. An RFID tag-containing apparatus comprising:
    at least one shielded state-switchable container section that can be switched between a shielded state in which radio waves are blocked and a non-shielded state in which the radio waves are not blocked, and contains at least one article therein;
    a receiver device that is disposed at a location close to said shielded state-switchable container section, for receiving one of information transmitted from an RFID tag attached to the article contained in said shielded state-switchable container section and a reading signal from an RFID reader;
    a notification signal output device that is operable either when said receiver device receives the information transmitted from the RFID tag or when said receiver device receives the reading signal from the RFID reader, to output a notification signal for notifying the reception; and
    a state switching device that switches a state of said shielded state-switchable container section between the shielded state and the non-shielded state.

6. An RFID tag-containing apparatus as claimed in claim 5, wherein said shielded state-switchable container comprises a plurality of shielded state-switching container sections, and said state switching device selects one of said shielded state-switchable container sections and switches the state thereof.

7. An RFID tag-containing apparatus as claimed in claim 5, comprising a notification device that performs at least one of sound generation, light emission, and vibration based on the notification signal output from said notification signal output device.

8. An RFID tag-containing apparatus that can be carried by a user, comprising:
    a body that is formed of a shield material capable of blocking radio waves, said body having at least one container section;
    at least one cover that is formed of the shield material capable of blocking radio waves, said cover being detachably provided on said body;

a receiver device that is disposed at a location close to said body, for receiving one of information transmitted from an RFID tag attached to an article contained in said container section and a reading signal from an RFID reader; and a notification signal output device that is operable either when said receiver device receives the information transmitted from the RFID tag or when said receiver device receives the reading signal from the RFID reader, to output a notification signal for notifying the reception.

9. An RFID tag-containing seal comprising:

a seal that is formed of a sheet-like member capable of blocking radio waves, said seal having one adhesive face and covering an article;

a receiver device that is disposed at a location close to said seal, for receiving one of information transmitted from an RFID tag attached to the article covered by said seal and a reading signal from an RFID reader; and a notification signal output device that is operable either when said receiver device receives the information transmitted from the RFID tag or when said receiver device receives the reading signal from the RFID reader, to output a notification signal for notifying the reception, wherein said seal, said receiver device, and said notification signal output device can be carried together with the article by a user.

10. An RFID tag-containing seal as claimed in claim 9, wherein said receiver device and said notification signal output device are attached to the seal.

11. An apparatus for notifying a user when an RFID tag contained therein has been read by an external RFID tag reader, the apparatus comprising:

a container;

a receiver configured to read an information output by an RFID tag contained in the container in response to a reading signal sent from an external RFID tag reader, and not from the receiver; and a signaling device, wherein when the receiver reads the information, the receiver causes the signaling device to alert a user that the information has been read.

* * * * *